(12) United States Patent
Susitaival et al.

(10) Patent No.: US 9,173,203 B2
(45) Date of Patent: *Oct. 27, 2015

(54) METHOD AND ARRANGEMENT IN A WIRELESS COMMUNICATION SYSTEM

(71) Applicant: TELEFONAKTIEBOLAGET L M ERICSSON (PUBL), Stockholm (SE)

(72) Inventors: Riikka Susitaival, Helsinki (FI); Stefan Wager, Espoo (FI); Jessica Östergaard, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/033,939

(22) Filed: Sep. 23, 2013

(65) Prior Publication Data

US 2014/0016611 A1 Jan. 16, 2014

Related U.S. Application Data

(63) Continuation of application No. 13/380,401, filed as application No. PCT/SE2010/050113 on Feb. 2, 2010, now Pat. No. 8,543,125.

(60) Provisional application No. 61/221,179, filed on Jun. 29, 2009.

(51) Int. Cl.
*H04W 72/12* (2009.01)
*H04L 1/18* (2006.01)
(Continued)

(52) U.S. Cl.
CPC .............. *H04W 72/04* (2013.01); *H04L 1/188* (2013.01); *H04W 72/1284* (2013.01); *H04W 74/085* (2013.01)

(58) Field of Classification Search
CPC .................. H04W 72/0413; H04W 72/042
USPC ............... 455/455, 450–452.1, 434
See application file for complete search history.

(56) References Cited

U.S. PATENT DOCUMENTS

2005/0141467 A1 6/2005 Pan et al.
2006/0215602 A1 9/2006 Usuda
(Continued)

FOREIGN PATENT DOCUMENTS

WO 2006037492 A1 4/2006
WO WO 2006-118427 A2 11/2006
(Continued)

OTHER PUBLICATIONS

Ericsson E-DCH Scheduling. UE Request Procedures[online] 3GPP TSF-RAN WG 1#38bis; R1-041184, Sep. 2004.
(Continued)

*Primary Examiner* — Nam Huynh

(57) ABSTRACT

Method and arrangement in a user equipment for transmitting scheduling requests to a base station. The base station is adapted to serve the user equipment. The user equipment is configured to transmit scheduling requests to the base station only at certain predetermined scheduling request opportunities. The method comprises triggering a scheduling request transmission, transmitting a scheduling request to the base station at the next occurring scheduling request opportunity, starting a scheduling request prohibiting timer and prohibiting any further scheduling request retransmission at future scheduling request opportunities while the scheduling request prohibiting timer is running.

Also, a corresponding method and arrangement in a base station is described.

10 Claims, 8 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 2008/0004058 A1* | 1/2008 | Jeong et al. | 455/517 |
| 2009/0092103 A1 | 4/2009 | Rao | |
| 2009/0119564 A1 | 5/2009 | Sagfors | |
| 2009/0203323 A1 | 8/2009 | Ratasuk et al. | |
| 2009/0238165 A1 | 9/2009 | Cai et al. | |
| 2009/0305716 A1 | 12/2009 | Ono | |
| 2011/0058539 A1 | 3/2011 | Baker et al. | |

FOREIGN PATENT DOCUMENTS

| | | | |
|---|---|---|---|
| WO | WO 2009-035301 A2 | 3/2009 | |
| WO | WO 2009-038381 A2 | 3/2009 | |

OTHER PUBLICATIONS

ISR and Written Opinion From PCT/SE2010/050113 Dated May 3, 2010.
Antipolis, Sophia; "E-DCH Scheduling-UE Request Procedures"; R2-042220.
Peterson, Larry L.; Davie, Bruce S.; "Computer Networks A Systems Approach"; 1996.
Furht, Borko; Ahson, Syed; "Long Term Evolution 3GPP LTE Radio and Cellular Technology"; 2009.
3GPP TS 36.321 v8.6.0 "3rd Generation Partnership Project; Technical Specification Group Radio Access Network; Evolved Universal Terrestrial Radio Access (E-UTRA) Medium Access Control (MAC) Protocol Specification" Jun. 2009.
3GPP TS 36.331 v8.6.0 "3rd Generation Partnership Project; Technical Specification Group Radio Access Network; Evolved Universal Terrestrial Radio Access (E-UTRA) Radio Resource Control (RRC) Protocol Specification" Jun. 2009.
3GPP TR 25.808 v0.1.1 "3rd Generation Partnership Project; Technical Specification Group Radio Access Network; FDD Enhanced Uplink; Physical Layer Aspects" Sep. 2004.
3GPP TS 36.321 v9.1.0 "3rd Generation Partnership Project; Technical Specification Group Radio Access Network; Evolved Univeral Terrestrial Radio Access (E-UTRA) Medium Access Control (MAC) Protocol Specification" Dec. 2009.
3GPP TS 36.331 v9.1.0 "3rd Generation Partnership Project; Technical Specification Group Radio Access Network; Evolved Universal Terrestrial Radio Access (E-UTRA) Radio Resource Control (RRC) Protocol Specification" Dec. 2009.
Communication of notices of opposition (R.79(1) EPC) for EP Application No. 10707369.4; Sep. 12, 2013.
Response to notices of opposition (R.79(1) EPC) for EP Application No. 10707369.4; Mar. 12, 2014.
3GPP TS 36.300 v8.9.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Jun. 2009.
3rd Generation Partnership Project; Technical Specification Group Radio Access Network; Services Provided by the Physical Layer (Release 5). 3GPP TS 25.302 v5.7.0 (2003-12).
3rd Generation Partnership Project; Technical Specification Group Radio Access Network; Services Provided by the Physical Layer (Release 5). 3GPP TS 25.302 v7.6.0 (2007-12).
3rd Generation Partnership Project; Technical Specification Group Radio Access Network; Evolved Universal Terrestrial Radio Access (E-Utra); Physical Layer Procedures (Release 8). 3GPP TS 36.213 v8.7.0 (2009-05).
Opposition Response for EP Application No. 10707369.4; Jun. 5, 2015.
3GPP TS 36.213 v8.7.0 (2009-05) $3^{rd}$ Generation Partnership Project; Technical Specification Group Radio Access Network; Evolved Universal Terrestrial Radio Access (E-Utra); Physical Layer Procedures (Release 8).
3GPP TS 25.302 v7.6.0 (2007-12) $3^{rd}$ Generation Partnership Project; Technical Specification Group Radio Access Network; Services Provided by the physical layer(Release 7).
3GPP TS 25.302 v5.7.0 (2003-12) $3^{rd}$ Generation Partnership Project; Technical Specification Group Radio Access Network;Services Provided by the physical layer(Release 5).

* cited by examiner

METHOD AND ARRANGEMENT IN A WIRELESS COMMUNICATION SYSTEM

CLAIMING BENEFIT OF PRIOR FILED U.S. APPLICATION

This application is a continuation of U.S. patent application Ser. No. 13/380,401, filed Dec. 22, 2011, which corresponds to the national-stage entry International Application PCT/SE2010/050113, with an international filing date of Feb. 2, 2010, and which claims the benefit of U.S. Provisional Application No. 61/221,179, filed Jun. 29, 2009.

The contents of all of the preceding are hereby incorporated by reference herein.

TECHNICAL FIELD

The present invention relates to a method and an arrangement in a base station and a method and an arrangement in a user equipment. In particular, it relates to a mechanism for reducing load and interference on communication channels when transmitting scheduling requests.

BACKGROUND

Standardization for the fourth Generation (4G) of cellular networks is on going under the name International Mobile Telecommunications Advanced (IMT Advanced). IMT Advanced promises the next generation mobile network with high data rates, seamless connectivity and mobile communication within heterogeneous networks.

For many applications, a short access delay plays a crucial role in providing a good end user performance. IMT Advanced latency requirements state that the one way radio access delay between the mobile terminal and the base station should be under 10 ms.

The Long Term Evolution (LTE) network defined by 3rd Generation Partnership Project (3GPP) provides improved bit rates with lower access delays as compared to the older technologies. For Release-8 user equipment units (UEs), the IMT Advanced delay target is reached if the user equipment unit is scheduled. If the user equipment needs to request resources, the delay target is not reached.

The access technology of LTE is based on Orthogonal Frequency Division Multiplexing (OFDM) in the downlink and Single Carrier Frequency Division Multiple Access (SC-FDMA) in the uplink.

In the present context, the expression uplink is used for the transmission of signals from the user equipment to the base station while the expression downlink is used for transmission of signals in the opposite direction, i.e. from the base station to the user equipment. The base station may further in an LTE environment be referred to as an eNodeB, or eNB.

The resources are allocated either dynamically in 1 ms basis for the user equipments on both the downlink and the uplink or semi-persistently over a longer period than 1 ms. The scheduling of resources is done by the eNB and it takes into account the user equipment data buffer as well as radio propagation characteristics of each user equipment.

The standard uplink scheduling procedure in LTE is shown in FIG. 1. When new data arrives to the empty user equipment buffer or the data that belongs to a higher priority logical channel group than existing data, the user equipment triggers a Buffer Status Report (BSR) to report its buffer size. If the user equipment does not have uplink resources to transmit the buffer status report, it triggers a Scheduling Request (SR).

The scheduling request can be sent on a dedicated scheduling request channel (D-SR) or on the contention based Random Access Channel (RA-SR). Use of the dedicated scheduling request channel requires that the user equipment is uplink synchronized and that the user equipment has been assigned a scheduling request channel on the Physical Uplink Control Channel (PUCCH). The dedicated scheduling request resource is assigned with Radio Resource Control (RRC) protocol having a periodicity with current values of 5, 10, 20, 40 and 80 milliseconds in LTE Release-8. In LTE Release-9, even shorter values than 5 milliseconds, are possible. When the eNB has received the scheduling request, it can schedule the user equipment and transmit an initial grant. Using the initial grant, the user equipment can finally transmit the buffer status report with it.

In summary, before the user equipment is scheduled, multiple steps have to be taken. This increases the access delay in the uplink. When being in uplink synchronized, the scheduling request periodicity in PUCCH is one of the biggest contributors in delay increase. To obtain best performance of certain applications, the scheduling request periodicity should be selected to very short value.

In the 3GPP TS 36.321 MAC specification, V8.6.0, the scheduling request is pending from the time when it is trigged until the time when it is cancelled. The scheduling request is cancelled when uplink scheduling resources are available for a new transmission.

When the scheduling request is pending, during every subframe when the user equipment unit has valid scheduling request resources on PUCCH, the user equipment unit instructs the physical layer to signal scheduling request. This leads to the physical transmission of the scheduling request. In the example depicted in FIG. 1, the scheduling request periodicity is fixed to 5 ms and the first opportunity to transmit the scheduling request on PUCCH is in subframe t0. After the eNB has received the scheduling request, a typical processing time of 3 ms is assumed before the user equipment unit is scheduled and the grant is transmitted. The user equipment unit has a next scheduling request opportunity in 5 ms later, at t1. Because the user equipment unit has not cancelled the scheduling request yet, it will retransmit it. As a result, configuring the scheduling request periodicity to 5 ms leads to physical transmission of the scheduling request at least twice. This generates a significant unnecessary load on PUCCH.

The mechanism that the transmission of scheduling requests is prohibited is known as well as configuration of such mechanism by the network, see WO 2009038381 A2 METHOD OF RESTRICTING SCHEDULING REQUEST FOR EFFECTIVE DATA TRANSMISSION. However, in WO 2009038381 A2, the only mentioned condition when the transmission of scheduling request is prohibited is when the uplink synch, i.e., Time Alignment timer is expected to expire soon or when the overall number of scheduling request transmissions has exceeded a certain number. The idea of WO 2009038381 A2 is instead to start random access if scheduling request is prohibited.

SUMMARY

It is therefore an object of the present invention to provide a mechanism for improving the performance in a wireless communication system.

According to a first aspect of the present invention, the object is achieved by a method in a user equipment for transmitting scheduling requests to a base station. The base station is adapted to serve the user equipment. The user equipment further comprises a scheduling request transmission trigger and is configured to transmit scheduling requests to the base station. However, the scheduling requests are transmitted only at certain predetermined scheduling request opportunities. The method comprises starting the scheduling request transmission trigger. Also, a scheduling request is transmitted to the base station at the next occurring scheduling request opportunity as a response to the started trigger. Further, a scheduling request prohibiting timer, comprised in the user equipment, is started when the scheduling request is transmitted to the base station for the first time. In addition, any further scheduling request retransmission at future scheduling request opportunities are prohibited while the scheduling request prohibiting timer is running.

According to a second aspect of the present invention, the object is achieved by an arrangement in a user equipment for transmitting scheduling requests to a base station. The base station is adapted to serve the user equipment. The user equipment further comprises a scheduling request transmission trigger and is configured to transmit scheduling requests to the base station. However, the scheduling requests are transmitted only at certain predetermined scheduling request opportunities. The arrangement comprises a scheduling request transmission trigger. The scheduling request transmission trigger is configured to trigger a scheduling request transmission. Also, the arrangement comprises a transmitter. The transmitter is configured to transmit a scheduling request to the base station at the next occurring scheduling request opportunity as a response to the started trigger. In addition, the arrangement further also comprises a scheduling request prohibiting timer. The scheduling request prohibiting timer is configured to start when the scheduling request is transmitted and to prohibit any further scheduling request retransmission at future scheduling request opportunities while the scheduling request prohibiting timer is running.

According to a third aspect of the present invention, the object is achieved by a method in a base station for assisting a user equipment in transmitting scheduling requests to the base station. The base station is adapted to serve the user equipment. The user equipment is configured to transmit scheduling requests to the base station only at certain predetermined scheduling request opportunities. The method comprises determining a factor k to be transmitted to the user equipment, enabling the user equipment to calculate a scheduling request prohibiting timer length. Further, the method also comprises transmitting the determined factor k to the user equipment. In addition, the method further comprises scheduling the user equipment when a scheduling request is received from the user equipment.

According to a fourth aspect of the present invention, the object is achieved by an arrangement in a base station for assisting a user equipment in transmitting scheduling requests to the base station. The base station is adapted to serve the user equipment. The user equipment is configured to transmit scheduling requests to the base station only at certain predetermined scheduling request opportunities. The arrangement comprises a determination unit. The determination unit is configured to determine a factor k to be transmitted to the user equipment in order for the user equipment to calculate a scheduling request prohibiting timer length. Further, the arrangement comprises a transmitter. The transmitter is configured to transmit the determined factor k to the user equipment. Additionally, the arrangement comprises a scheduler. The scheduler is configured to schedule the user equipment when a scheduling request is received from the user equipment.

By starting a scheduling request prohibit timer when the user equipment has transmitted the scheduling request on PUCCH first time, the load on PUCCH can be reduced significantly. Further, by configuring scheduling request prohibit timers for different user equipments with different lengths, the retransmissions of scheduling requests are distributed in time as well. Thus the performance of the wireless communication system is improved.

Other objects, advantages and novel features of the invention will become apparent from the following detailed description of the invention.

BRIEF DESCRIPTION OF THE DRAWINGS

The invention is described in more detail with reference to attached drawings illustrating exemplary embodiments of the invention and in which.

DETAILED DESCRIPTION

The invention is defined as a method and an arrangement in a user equipment and a method and an arrangement in a base station, which may be put into practice in the embodiments described below. This invention may, however, be embodied in many different forms and is not to be considered as limited to the embodiments set forth herein; rather, these embodiments are provided so that this disclosure will be thorough and complete, and convey the scope of the invention to those skilled in the art.

Still other objects and features of the present invention may become apparent from the following detailed description considered in conjunction with the accompanying drawings. It is to be understood, however, that the drawings are designed solely for purposes of illustration and not as a definition of the limits of the invention, for which reference is to be made to the appended claims. It is further to be understood that the drawings are not necessarily drawn to scale and that, unless otherwise indicated, they are merely intended to conceptually illustrate the structures and procedures described herein.

Figure 1:
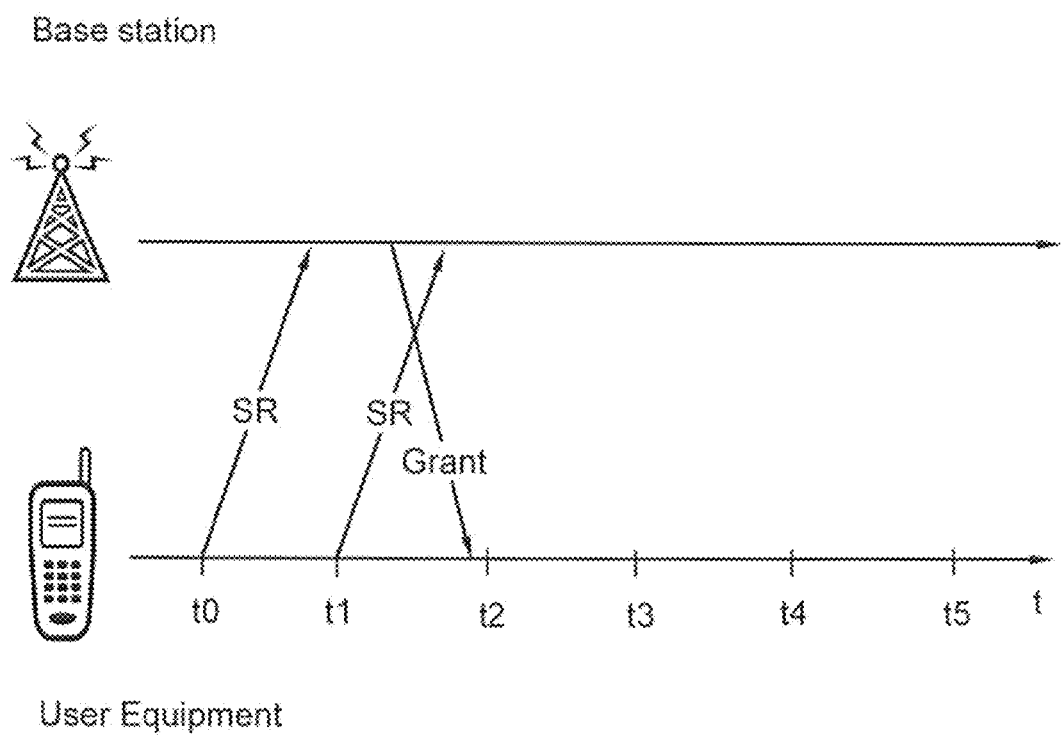
FIG. 1 is a schematic block diagram illustrating communication within a prior art wireless communication system.
Figure 2:
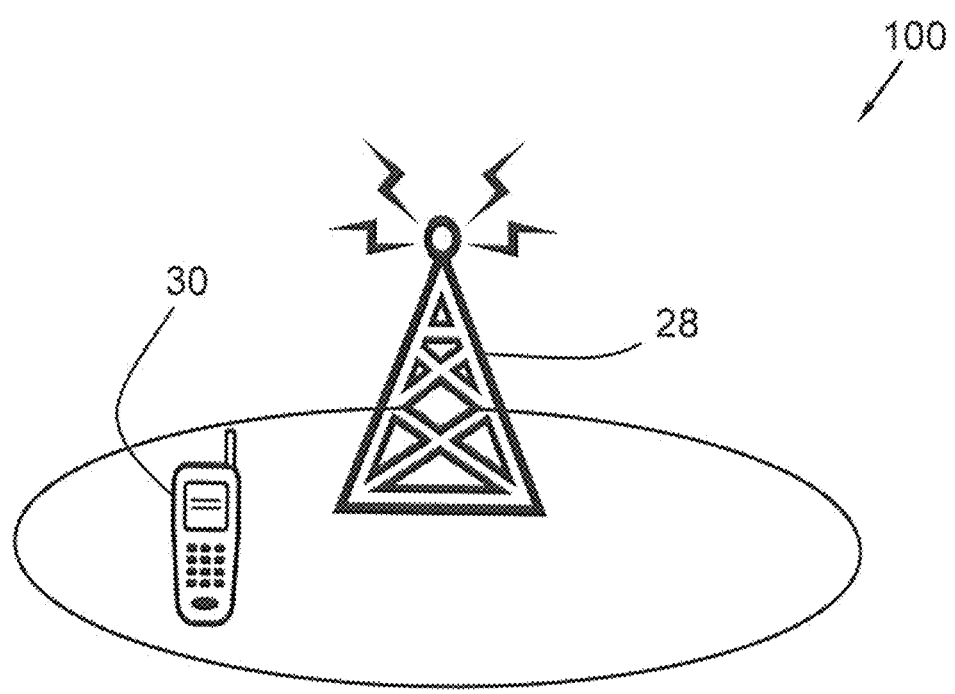
FIG. 2 is a schematic block diagram illustrating embodiments of a wireless communication system.

FIG. 2 depicts an exemplary wireless communication system 100, such as e.g. the IMT Advanced, E-UTRAN, LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few arbitrary possible options.

The wireless communication system 100 comprises a base station 28 and a user equipment 30, adapted to communicate with each other over at least one radio channel, within a cell. It will be appreciated that the wireless communication system 100 typically may comprise numerous other nodes, such as other base station nodes and, in some embodiments, other nodes such as control nodes and the like. Only a strictly limited selection of nodes 28, 30 are shown in FIG. 2 for sake of simplicity.

The base station 28 may be referred to as e.g. a NodeB, an evolved Node B (eNode B, or eNB), a base transceiver station, Access Point Base Station, base station router, or any other network unit capable to communicate with the user equipment 30 within the cell, depending e.g. of the radio access technology and terminology used. In the rest of the description, the term "base station" will be used for the base station 28, in order to facilitate the comprehension of the present methods and arrangements.

The base station 28 comprises one or more transceivers which is/are configured to transmit a frame of information for transmission over a radio interface. For downlink transmission to the user equipment 30, the transceiver/s feed plural antennae which function to provide plural sub-carriers. The transceiver/s thereby transmits symbols of the subframes of the frame on the downlink on plural sub-carriers in a frequency domain.

The base station 28 may also comprise a base station frame handler, according to some embodiments. The subframe handler may be configured to prepare or format the frame of information for transmission by transceiver/s on a downlink to the user equipment 30. The optional base station frame handler has access to or may in some implementations comprise resource manager/scheduler. The resource manager/scheduler maintains and allocates resources for the user equipment 30 and other user equipment units (not illustrated) and schedules resources. One of the types of resources which is supervised by resource manager/scheduler are Physical Uplink Control Channel (PUCCH) resources. The PUCCH carries uplink control information and supports multiple formats.

The user equipment 30 may be represented by e.g. a wireless communication terminal, a mobile cellular phone, a Personal Digital Assistant (PDA), a wireless platform, a laptop, a computer or any other kind of device capable to communicate wirelessly with the base station 28.

The user equipment 30 shown in FIG. 2 may comprise transceiver/s. The transceiver/s may comprise or be connected to user equipment antennas. The user equipment 30 may also comprise a user equipment frame handler, according to some embodiments. The wireless terminal frame handler may receive and process downlink subframes and may prepare and format uplink subframes. At least one of the uplink subframes prepared by user equipment frame handler and transmitted by transceiver/s from user equipment 30 to base station 28 carries the Physical Uplink Control Channel (PUCCH).

The user equipment 30 may also comprise a scheduling request prohibit timer which is configured and serves to prohibit the user equipment unit 30 from transmitting the scheduling request too early after the previous scheduling request attempt.

In the following, the present methods and arrangements are further elaborated with specific reference to IMT-Advanced systems and more particularly with respect to the uplink in IMT-Advanced, i.e. for the link from the user equipment 30 to the base station 28. However, it is obvious to a skilled person that corresponding concepts could also be applied in other wireless communication systems 100.

The present methods and arrangements provide a scheduling request prohibit timer, which is started when the user equipment 30 has transmitted a scheduling request on PUCCH to the base station 28 for the first time. The idea of the scheduling request prohibit timer is to prohibit the user equipment 30 to transmit the scheduling request too early after the previous scheduling request attempt.

Thereby may the load on PUCCH be reduced significantly, as redundant scheduling requests are not transmitted. Further, according to some embodiments, scheduling request prohibit timers for different user equipment 30 may be configured with different timer lengths. Thereby retransmissions of scheduling requests from different user equipment 30 are distributed in time, such that collision between user equipment transmissions may be avoided.

Figure 3:
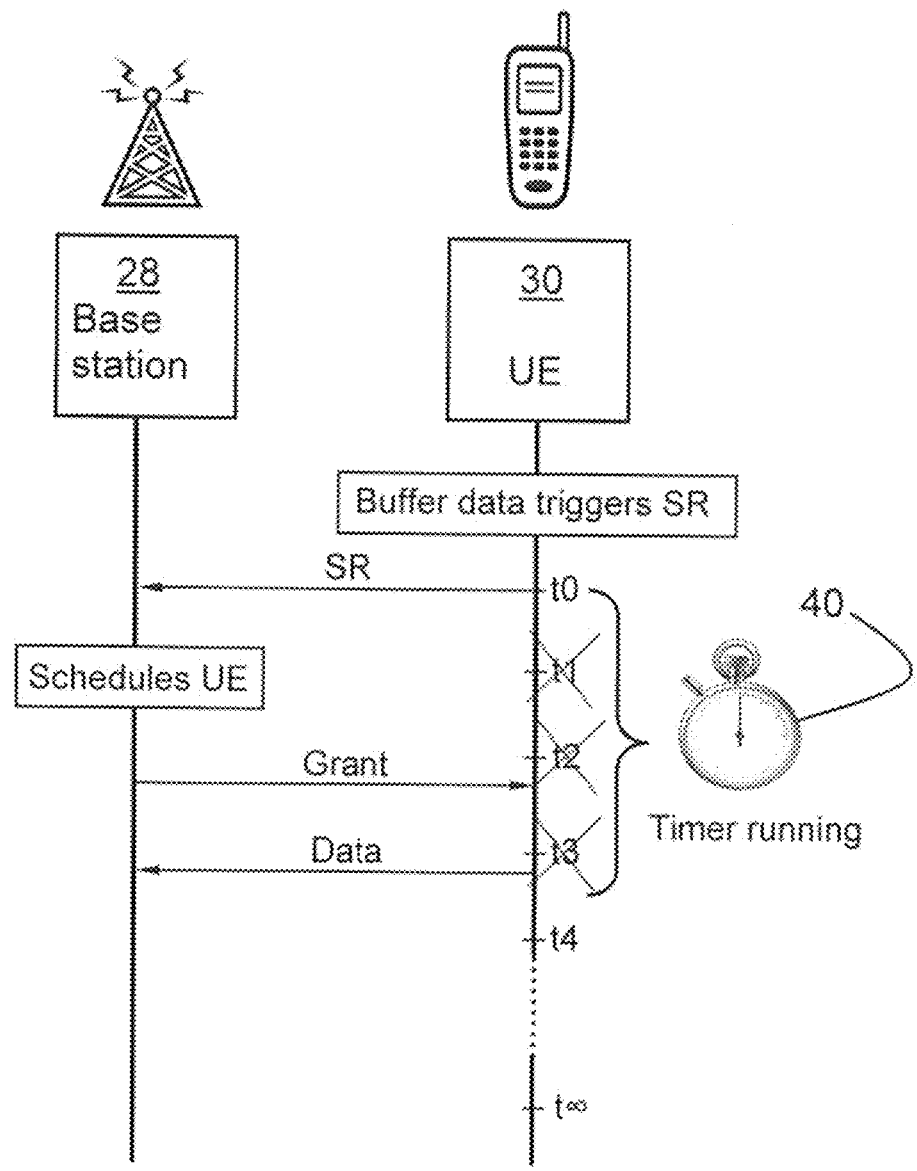
FIG. 3 is a combined signalling and flowchart illustrating radio signal transmission according to some embodiments.

FIG. 3 is a combined signalling and flowchart illustrating radio signal transmission between the user equipment 30 and the base station 28, according to some embodiments. The purpose of this illustration is to provide a general overview of the present methods and the functionalities involved. Also, the general purpose and an exemplary environment in which the present methods and arrangements may be implemented are illustrated.

Data is received in the user equipment buffer. The reception and/or detection of data to transmit in the user equipment buffer triggers the transmission of a scheduling request SR to the base station 28. The scheduling request SR is used for requesting uplink scheduling resources for transmission of the received/detected data.

However, the user equipment 30 is only allowed to transmit scheduling requests SR at certain predetermined scheduling request opportunities t0, t1, t2, t3, t4, . . . , t∞. There may be an infinite number of possible predetermined scheduling request opportunities t0, t1, t2, t3, t4, . . . , t∞, or a limited number of scheduling request opportunities t0, t1, t2, t3, t4, . . . , t∞, wherein t∞ is limited to t-max, according to different embodiments.

Thus a scheduling request SR has been triggered, due to received data in the user equipment buffer. In the illustrated example in FIG. 3, the triggered scheduling request SR is not allowed to be transmitted until the next possible scheduling request opportunity t0. Thereby the scheduling request SR is to be considered as pending until it is cancelled.

All pending scheduling requests SR may be cancelled and scheduling request prohibit timer may be stopped when a data is assembled and this data comprises a buffer status report which comprises buffer status up to the last event that triggered a buffer status report, or when the uplink grant can accommodate all pending data available for transmission.

If the user equipment 30 has no valid PUCCH resource for transmitting a scheduling request SR configured in any predetermined scheduling request opportunities t0, t1, t2, t3, t4, . . . , t∞ a Random Access procedure may be initialised and all pending scheduling requests may be cancelled. Otherwise, if the user equipment 30 has a valid PUCCH resource for scheduling requests SR at least some predetermined scheduling request opportunities t0, t1, t2, t3, t4, . . . , t∞, and no scheduling request prohibit timer 40 is running, the generated scheduling request SR may be transmitted at the next scheduling request opportunity t0.

When the triggered scheduling request SR is transmitted at t0 on PUCCH, the scheduling request prohibit timer 40 is started. The scheduling request prohibit timer 40 is comprised in the user equipment unit 30. When the scheduling request prohibit timer 40 is running, the user equipment unit 30 is not allowed to retransmit the scheduling request SR. According to some embodiments, the user equipment 30 may set the scheduling request prohibit timer 40 to 0 (zero), when a scheduling request SR is triggered and there is no other scheduling request SR pending.

When the scheduling request prohibit timer 40 is expired, the user equipment unit 30 is allowed to re/transmit the scheduling request SR on PUCCH again. The timer 40 is stopped when it expires, except when the user equipment unit 30 cancels the scheduling request SR, when also the scheduling request prohibit timer 40 may be stopped.

The scheduling request prohibit timer 40 may according to some embodiments be set to zero when it is initiated and then incremented for each passing time unit until a predetermined max timer value is reached. According to some embodiments however, the scheduling request prohibit timer 40 may be set to a predetermined max timer value when initiated and then counted down to zero, or alternatively to any other predetermined minimum timer value is reached.

As long as the scheduling request prohibit timer 40 is running, the scheduling request SR is not resent. In the illustrated example in FIG. 3, the scheduling request SR is cancelled in t1, t2 and t3.

When the base station 28 receives the scheduling request SR from the user equipment 30, the base station 28 schedules the user equipment 30. Thereby a grant may be generated and transmitted to the user equipment 30, such that the user equipment 30 may be allocated resources for uplink transmission of the data received in the user equipment buffer.

When the user equipment 30 receives the grant, the data is transmitted to the base station 28 at the allocated resources.

Figure 4A:
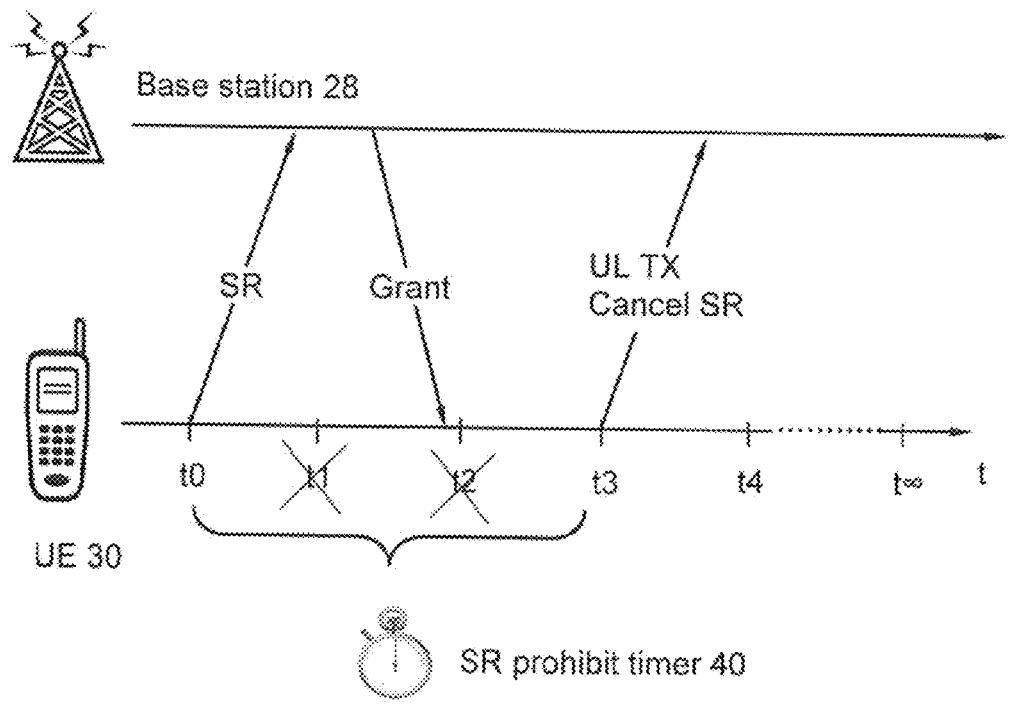
FIG. 4A is a combined signalling and flowchart illustrating radio signal transmission according to some embodiments.

FIG. 4A is a combined signalling and flowchart illustrating radio signal transmission according to some embodiments.

FIG. 4A illustrates use of the scheduling request prohibit timer 40 when the grant is received in a subframe and the scheduling request prohibit timer 40 stopped when the scheduling request SR cancelled. In other words, in FIG. 4A the scheduling request prohibit timer 40 prohibits the user equipment 30 from transmitting the scheduling request SR twice. The scheduling request prohibit timer 40 is stopped when the scheduling request SR is cancelled. If a new scheduling request SR is triggered after stopping the scheduling request timer, the user equipment 30 is allowed to transmit the scheduling request SR again.

Figure 4B:
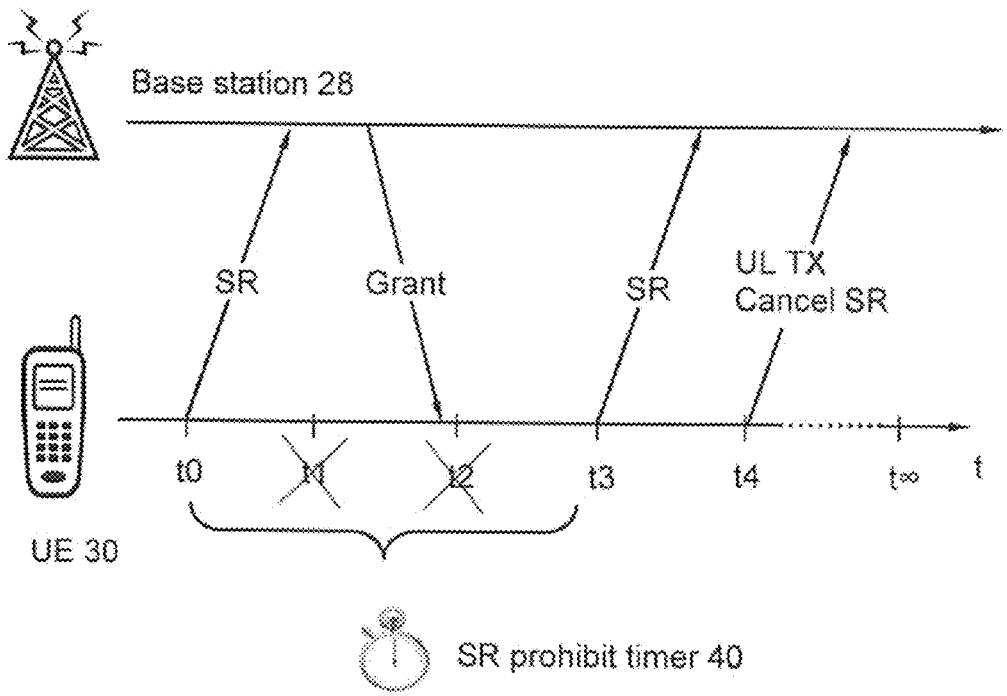
FIG. 4B is a combined signalling and flowchart illustrating radio signal transmission according to some embodiments.

FIG. 4B is a combined signalling and flowchart illustrating radio signal transmission according to some embodiments.

In the illustration of FIG. 4B the scheduling request prohibit timer 40 expires before the scheduling request SR is cancelled. That is, the scheduling request prohibit timer 40 prohibits the user equipment unit 30 from transmitting the scheduling request SR at subframe t1 and t2. The scheduling request prohibit timer 40 is stopped when it expires. After expiration of the scheduling request prohibiting timer 40, the user equipment 130 is allowed to transmit the pending scheduling request SR again.

Thus, if the SR prohibit timer 40 has expired and there is still pending scheduling requests SR, they are allowed to be retransmitted. If the SR prohibit timer 40 is stopped due to cancellation of scheduling requests SRs, then there is no pending scheduling requests SRs, but when a new triggered scheduling request SR arrives, that may be transmitted, and the SR prohibit timer 40 may be started again etc.

A negative side of the scheduling request prohibit timer 40 is that if the scheduling request SR is missed by the base station 28, the re-attempt is delayed. To avoid too long delays in the case of missed scheduling requests SR, the scheduling request prohibit timer 40 may not be too long according to some embodiments. On the hand, introducing the scheduling request prohibit timer 40 may decrease the load on PUCCH and thus the need for the retransmission of a scheduling request SR is smaller.

In addition to avoiding unnecessary scheduling requests SR and thus loading PUCCH too much, the scheduling request prohibit timer 40 could be utilized in spreading the re-attempts of missed scheduling requests SR in the time domain. Consider that two user equipment units located in the neighbouring cells transmit the scheduling request SR on the same PUCCH resource at the same time. Due to interference, the base station 28 in the corresponding cells may cannot detect which user equipment 30 was transmitting the scheduling request SR and thus do not schedule any of the user equipment 30. If these two user equipment units have the same scheduling request periodicity, they make the retransmissions of the scheduling requests SR at the same time leading to high interference again. If these two user equipment units would have different scheduling request prohibit timer lengths, then the correlation in the interference with the lag of scheduling request periodicity may be avoided.

The scheduling request prohibit timer 40 can take various example embodiments and have differing implementations. The following are possible non-limiting and non-exhaustive example implementations and/or configurations.

Example Implementation 1: The scheduling request prohibit timer length may be fixed to some common value such as e.g. 10 ms or the length of scheduling request periodicity.

Example Implementation 2: The scheduling request prohibit timer 40 has a fixed length and it is configured by the base station 28 with RRC. The possible value could be k multiplied with the scheduling request periodicity, where k may be signalled by RRC. Having 4 different possible values of k=0, 1, 2, 3 may give flexibility to the base station 28 to decide how it would like the user equipment 30 to behave, according to some embodiments.

Example Implementation 3: The scheduling request prohibit timer length can be, for example, (k+l) multiplied with the scheduling request periodicity, where k is configured by the base station 28 and the l is random part selected by the user equipment 30 ranging between [0, 1, . . . , m]. An example proper value for m could be 4, according to some embodiments.

Example Implementation 1 may be the simplest solution to avoid unnecessary scheduling requests SR. Example Implementation 2 may provide more flexibility to base station 28 to configure different user equipment 30 with different values and thus avoid reattempts of scheduling requests SR at the same time. It is also a way of handling the trade-off between avoiding unnecessary reattempts and increasing delay for necessary reattempts, where the trade-off might be seen differently for different services. Finally, having a random part in the scheduling request prohibit timer 40 as is proposed in Example Implementation 3, the interference between neighbouring cells due to colliding re-attempts of scheduling requests SR could be reduced.

The base station 28 thus may configure the scheduling request prohibit timer 40 so that the user equipment 30 does not transmit an unnecessary scheduling request SR on PUCCH just after the previous attempt. In this way the load on PUCCH can be reduced and unnecessary interference avoided. In addition, having a random part, the scheduling request prohibit timer 40 enables the scheduling request SR retransmission attempts of different user equipment 30 to occur at different time.

Figure 5:
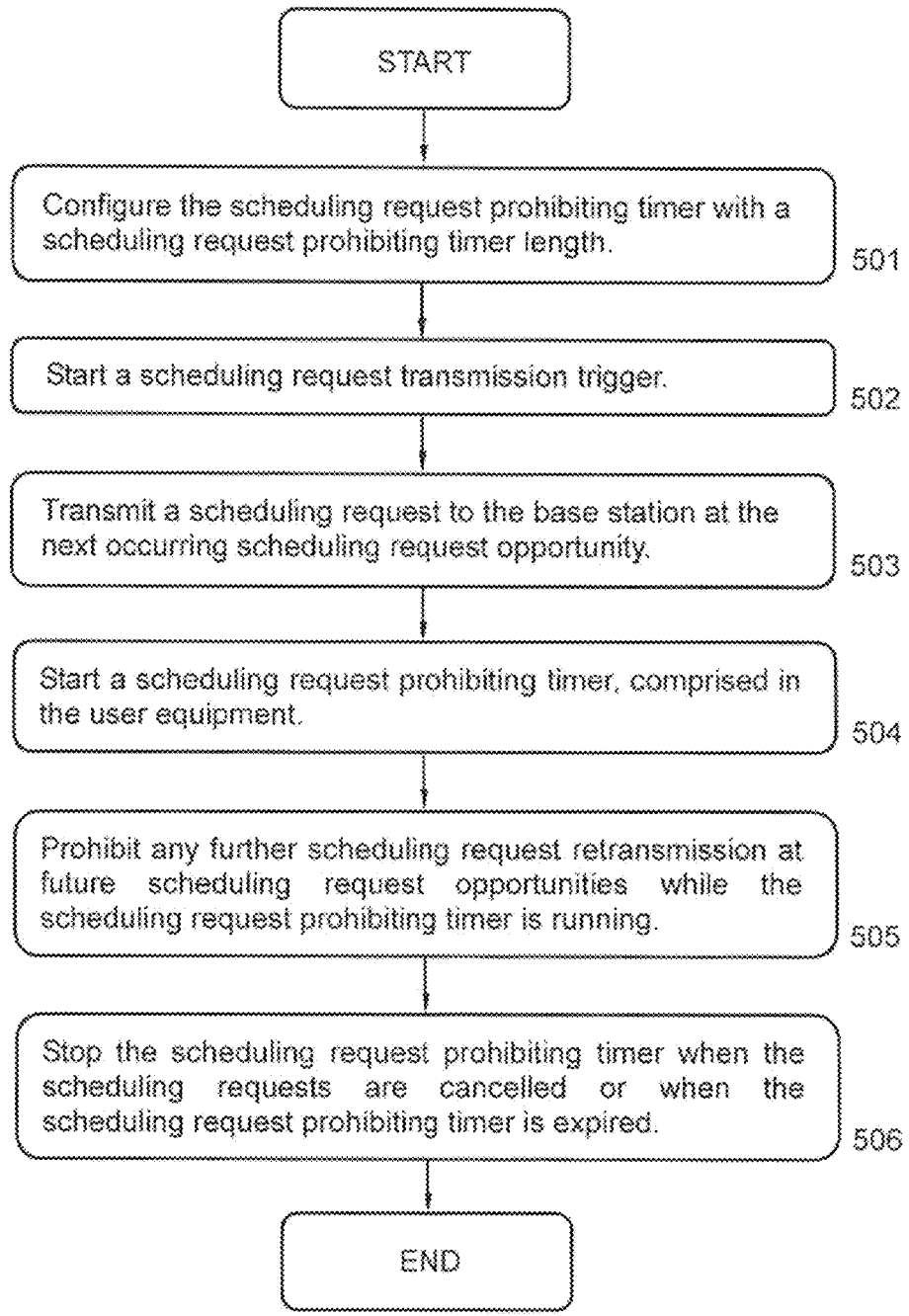
FIG. 5 is a flow chart illustrating embodiments of a method in a user equipment.

FIG. 5 is a flow chart illustrating embodiments of method steps 501-506 performed in a user equipment 30 for transmitting scheduling requests SR to a base station 28. The base station 28 is configured to serve the user equipment 30. The user equipment 30 comprises a scheduling request transmission trigger 620. Further, the user equipment 30 is configured to transmit scheduling requests SR to the base station 28 only at certain predetermined scheduling request opportunities t0, t1, t2, t3, t4, . . . , t∞.

The base station 28 and the user equipment 30 are comprised in a wireless communication system 100. The wireless communication system 100 may be e.g. an IMT Advanced or LTE radio network and the base station 28 may be e.g. an evolved node B, eNB, according to some embodiments.

The user equipment 30 comprises a scheduling request prohibiting timer 40.

To appropriately transmit scheduling requests SR to the base station 28, the method may comprise a number of method steps 501-506.

It is however to be noted that some of the described method steps are optional and only comprised within some embodiments. Further, it is to be noted that the method steps 501-506 may be performed in a somewhat different chronological order and that some of them, e.g. step 502 and step 503, or even all steps may be performed simultaneously or in an altered or rearranged chronological order. The method may comprise the following steps:

Step 501

This step is optional and may only be comprised within some embodiments.

The scheduling request prohibiting timer 40 may be configured with a scheduling request prohibiting timer length, such that the scheduling request prohibiting timer 40 expires when the configured scheduling request prohibiting timer length has passed, after having started the scheduling request prohibiting timer 40.

Step 502

The scheduling request transmission trigger 620 is started. Thereby is a scheduling request transmission triggered, which scheduling request SR is to be sent at the next occurring scheduling request opportunity t0, t1, t2, t3, t4, . . . , t∞ when the user equipment 30 is allocated resources to transmit the scheduling request SR.

The scheduling request transmission trigger 620 may be started when there is data in the user equipment buffer to send, according to some embodiments.

Step 503

A scheduling request SR is transmitted to the base station 28 at the next occurring scheduling request opportunity t0, t1, t2, t3, t4, . . . , t∞. The scheduling request SR is transmitted as a response to the started trigger 620.

Step 504

The scheduling request prohibiting timer 40 comprised in the user equipment 30 is started. The scheduling request prohibiting timer 40 is started when the scheduling request SR is transmitted to the base station 28 for the first time.

The scheduling request prohibiting timer 40 may be configured to a fixed scheduling request prohibiting timer length, according to some embodiments.

The scheduling request prohibiting timer 40 may be configured to a scheduling request prohibiting timer length, equal to the time between two scheduling request opportunities t0, t1, t2, t3, t4, . . . , t∞ multiplied with a factor k, such that:

Scheduling request prohibiting timer length=$k \cdot (t2-t1)$.

According to some embodiments may the scheduling request prohibiting timer 40 be configured to a scheduling request prohibiting timer length which is equal to the time between two scheduling request opportunities t0, t1, t2, t3, t4, . . . , t∞ multiplied with the result of the factor k operated by a random variable l, such that:

Scheduling request prohibiting timer length=$(k+l) \cdot (t2-t1)$.

The factor k may optionally be received from the base station 28. The random variable l may be randomly generated by the user equipment 30.

The factor k may be ranging between zero and infinity such that: $k=[0, 1, \ldots, \infty]$, wherein the factor k may be transmitted via Radio Resource Control (RRC) from the base station 28, and wherein the scheduling request SR may be transmitted on a Physical Uplink Control Channel (PUCCH).

Step 505

Any further scheduling request retransmission are prohibited at any future scheduling request opportunity t0, t1, t2, t3, t4, . . . , t∞ while the scheduling request prohibiting timer 40 is running, i.e. is not stopped.

Thereby, by not resending scheduling requests SR, the traffic load on the channel reduced, which leads to an overall improved capacity within the wireless communication network 100.

Step 506

This step is optional and may only be comprised within some embodiments.

The scheduling request prohibiting timer 40 is stopped when the scheduling requests SR are cancelled, or when the scheduling request prohibiting timer 40 is expired.

Figure 6:
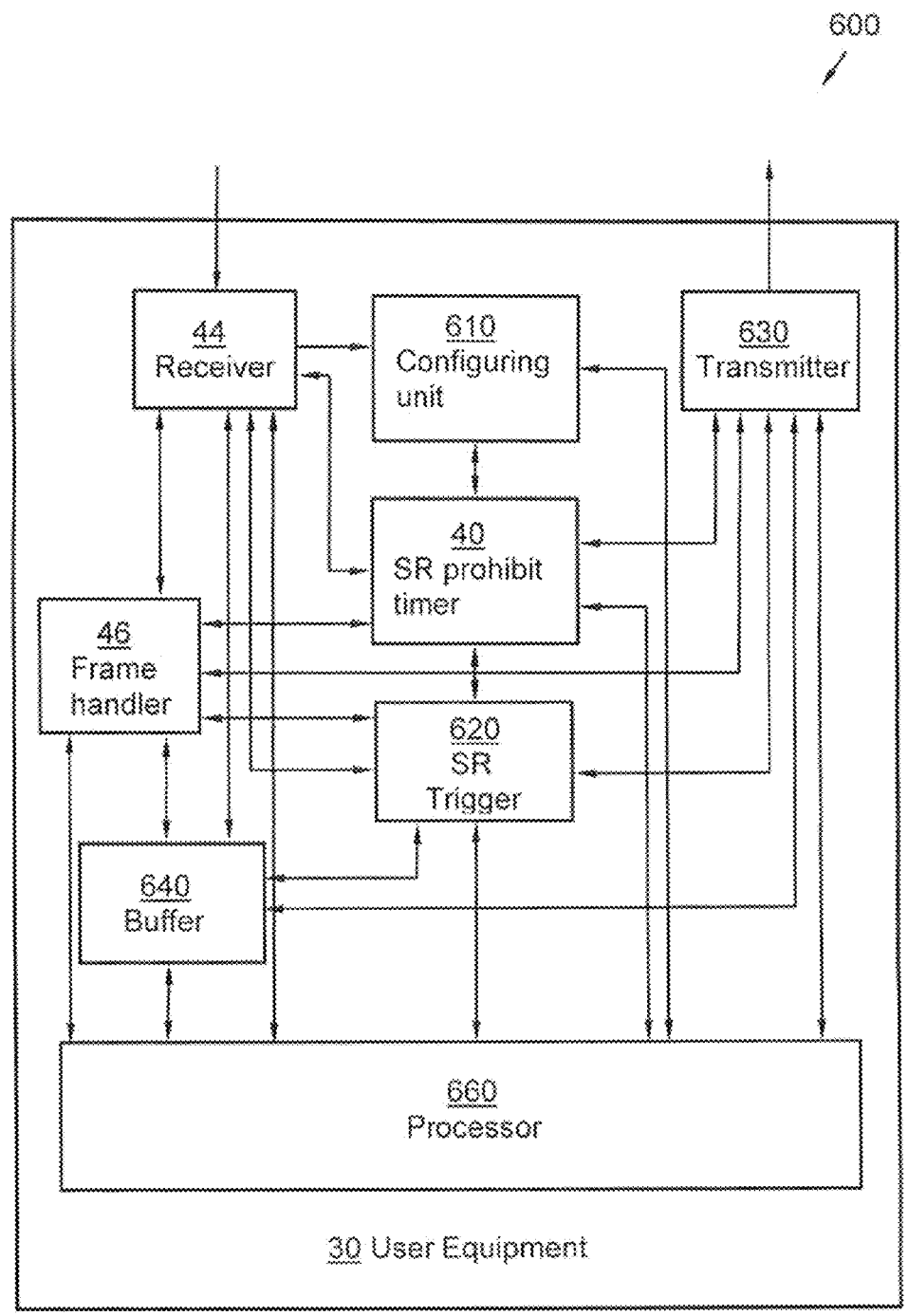
FIG. 6 is a schematic block diagram illustrating embodiments of a user equipment arrangement.

FIG. 6 schematically illustrates an arrangement 600 in a user equipment 30. The user equipment 30 is configured for performing the method steps 501-506 for transmitting scheduling requests SR to a base station 28. The base station 28 is adapted to serve the user equipment 30. The user equipment 30 is configured to transmit scheduling requests SR to the base station 28 only at certain predetermined scheduling request opportunities t0, t1, t2, t3, t4, . . . , t∞. The base station 28 and the user equipment 30 are comprised in a wireless communication system 100. The wireless communication system 100 may be e.g. an IMT Advanced or a LTE radio network. The base station 28 may be e.g. an evolved node B, eNB, according to some embodiments.

In order to perform the method steps 501-506 correctly, the user equipment arrangement 600 comprises a plurality of units such as e.g. a scheduling request transmission trigger 620. The scheduling request transmission trigger 620 is configured to trigger a scheduling request transmission. Further, the user equipment arrangement 600 comprises a transmitter 630. The transmitter 630 is configured to transmit a scheduling request SR to the base station 28 at the next occurring scheduling request opportunity t0, t1, t2, t3, t4, . . . , t∞, as a response to the triggered scheduling request transmission. Also, additionally, the arrangement 600 comprises a scheduling request prohibiting timer 40. The scheduling request prohibiting timer 40 is configured to start when the scheduling request SR is transmitted first time and to prohibit any further scheduling request retransmission at future scheduling request opportunities t0, t1, t2, t3, t4, . . . , t∞, while the scheduling request prohibiting timer 40 is running, i.e. is not stopped.

According to some embodiments, the arrangement 600 may further comprise a configuring unit 610. The optional configuring unit 610 is adapted to configure the scheduling request prohibiting timer 40 with a scheduling request prohibiting timer length, such that the scheduling request prohibiting timer 40 expires when the configured scheduling request prohibiting timer length has passed, after having started the scheduling request prohibiting timer 40. The configuring unit 610 may receive the scheduling request prohibiting timer length from the base station 28, according to some embodiments. However according to some embodiments the scheduling request prohibiting timer length may be predetermined, or calculated based on a scheduling request prohibiting timer length received from the base station 28.

Further, according to some embodiments the arrangement 600 may comprise a receiver 44. The receiver 44 is configured for receiving signals from the base station 28.

According to some embodiments, the arrangement 600 may optionally comprise a buffer 640. The buffer 640 is configured to receive and contain data, to be transmitted.

In further addition, the arrangement 600 may comprise a transmitter 630. The transmitter 630 is configured to transmit signals e.g. to the base station 28, according to some embodiments.

Also, furthermore, the arrangement 600 may comprise a frame handler 46. The frame handler 46 is configured to receive and process the downlink subframes and prepare and format the uplink subframes.

Optionally, the arrangement 600 further also may comprise a processor 660. The processor 660 may be represented by e.g. a Central Processing Unit (CPU), a processing unit, a microprocessor, or other processing logic that may interpret and execute instructions. The processor 660 may perform all data processing functions for inputting, outputting, and processing of data including data buffering and device control functions, such as call processing control, user interface control, or the like.

It is to be noted that any internal electronics of the user equipment 30 and/or the user equipment arrangement 600, not completely necessary for understanding the present method according to the method steps 501-506 has been omitted from FIG. 6, for clarity reasons. Further, it is to be noted that some of the described units 40-660 comprised within the arrangement 600 in the user equipment 30 are to be regarded as separate logical entities but not with necessity separate physical entities. To mention just one example, the receiver 44 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 28 and the user equipment 30 may comprise both traffic and control signals e.g. paging signals/messages for incoming calls, which may be used to establish and maintain a voice call communication with another party or to transmit and/or receive data, such as SMS, e-mail or MMS messages, with a remote user equipment.

The method steps 501-506 in the user equipment 30 may be implemented through one or more processors 660 in the user equipment 30, together with computer program code for performing the functions of the present method steps 501-506. Thus a computer program product, such as e.g. a computer program storage medium, may comprise instructions for performing the method steps 501-506 in the user equipment 30 and may transmit scheduling requests SR to the base station 28.

The physical and tangible computer program product mentioned above may be provided for instance in the form of a data carrier carrying computer program code for performing the method steps according to the present solution when being loaded into the processor 660. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the user equipment 30 remotely, e.g. over an Internet or an intranet connection.

Further, a computer program product comprising instructions for performing at least some of the method steps 501-506 may be used for implementing the previously described method in the user equipment 30 for transmitting scheduling requests SR to a base station 28, when the computer program product is run on a processor 660 comprised within the user equipment 30.

Figure 7:
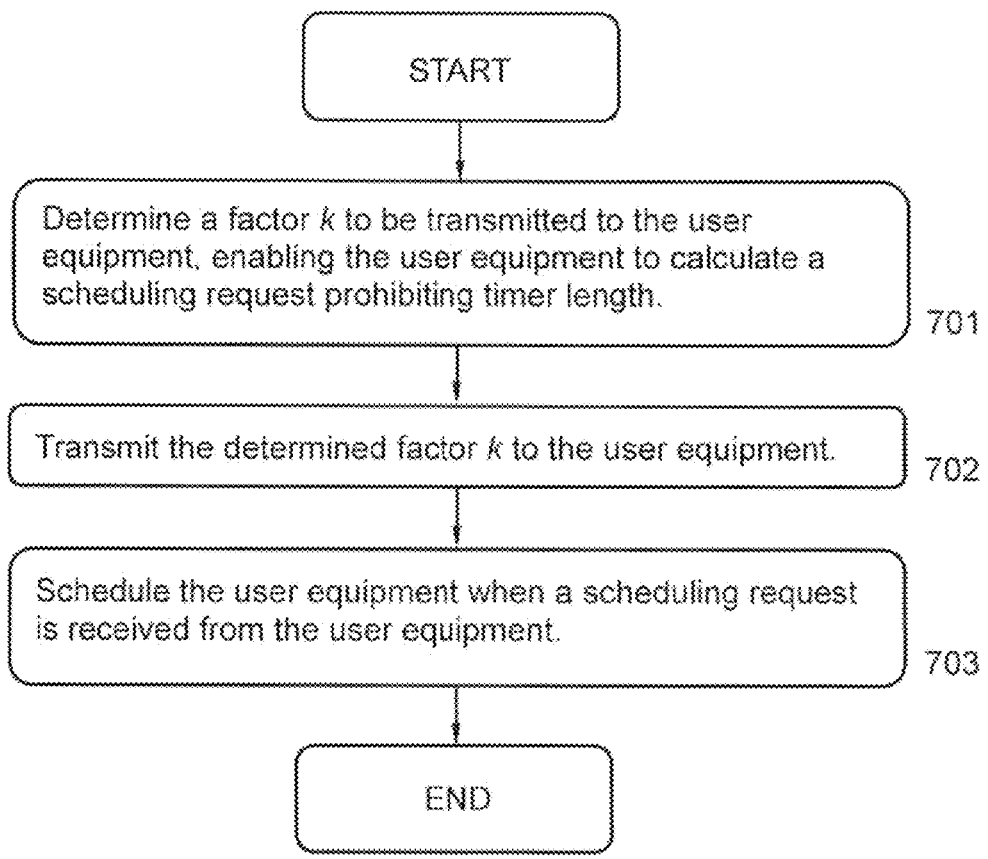
FIG. 7 is a flow chart illustrating embodiments of a method in a base station.

FIG. 7 is a flow chart illustrating embodiments of method steps 701-703 performed in a base station 28 for assisting a user equipment 30 in transmitting scheduling requests SR to the base station 28. The base station 28 is adapted to serve the user equipment 30. The user equipment 30 is configured to transmit scheduling requests SR to the base station 28 only at certain predetermined scheduling request opportunities t0, t1, t2, t3, t4, . . . , t∞. The base station 28 and the user equipment 30 are comprised in a wireless communication system 100. The wireless communication system 100 may be e.g. an IMT Advanced/LTE/LTE-Advanced radio network and the base station 28 may be e.g. an evolved node B, eNB, according to some embodiments.

To appropriately assist the user equipment 30 in transmitting scheduling requests SR to the base station 28, the method may comprise a number of method steps 701-703. It is to be noted that the method steps 701-703 may be performed in a somewhat different chronological order and that some of them may be performed simultaneously or in an altered or rearranged chronological order. The method may comprise the following steps:

Step 701

A factor k to be transmitted to the user equipment 30, enabling the user equipment 30 to calculate a scheduling request prohibiting timer length, is determined.

Step 702

The determined factor k is transmitted to the user equipment 30.

Step 703

The user equipment 30 is scheduled when a scheduling request SR is received from the user equipment 30.

Figure 8:
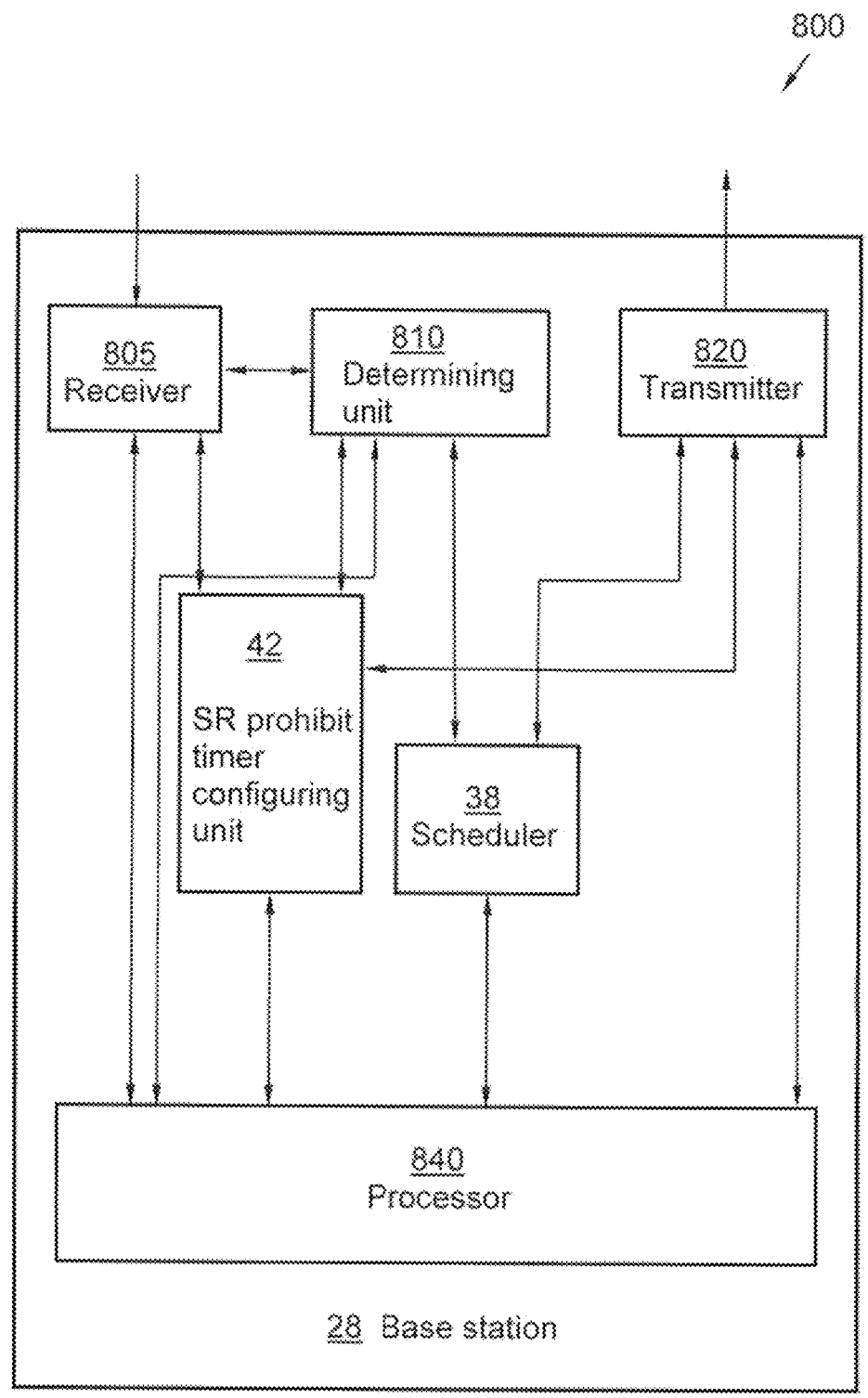
FIG. 8 is a schematic block diagram illustrating embodiments of a base station arrangement.

FIG. 8 schematically illustrates an arrangement 800 in a in a base station 28. The arrangement 800 is configured to perform the method steps 701-703. Thus the base station arrangement 800 is configured to assist a user equipment 30 in transmitting scheduling requests SR to the base station 28.

The base station 28 is adapted to serve the user equipment 30. The user equipment 30 is configured to transmit scheduling requests SR to the base station 28 only at certain predetermined scheduling request opportunities t0, t1, t2, t3, t4, . . . , t∞. The base station 28 and the user equipment 30 are comprised in a wireless communication system 100. The wireless communication system 100 may be e.g. an IMT Advanced or LTE radio network and the base station 28 may be e.g. an evolved node B, eNB, according to some embodiments.

In order to perform the method steps 701-703, the arrangement 800 comprises a plurality of units such as e.g. a determination unit 810. The determination unit 810 is configured to determine a factor k to be transmitted to the user equipment 30 in order for the user equipment 30 to calculate a scheduling request prohibiting timer length. Further the arrangement 800 comprises a transmitter 820. The transmitter 820 is configured to transmit the determined factor k to the user equipment 30. Additionally, the arrangement 800 comprises a scheduler 38. The scheduler 38 is configured to schedule the user equipment 30 when a scheduling request SR is received from the user equipment 30.

Further, optionally according to some embodiments, the base station arrangement 800 may comprise a receiver 805. The receiver 805 may be configured to receive a signal from the user equipment 30. Also, according to some embodiments, the arrangement 800 may comprise a scheduling request prohibit timer configuring unit 42.

Optionally, the arrangement 800 further also may comprise a processor 840. The processor 840 may be represented by e.g. a Central Processing Unit (CPU), a processing unit, a microprocessor, or other processing logic that may interpret and execute instructions. The processing unit 840 may perform all data processing functions for inputting, outputting, and processing of data including data buffering and device control functions, such as call processing control, user interface control, or the like.

It is to be noted that any internal electronics of the base station 28 and/or the base station arrangement 800, not completely necessary for understanding the present method according to the method steps 701-703 has been omitted from FIG. 8, for clarity reasons. Further, it is to be noted that some of the described units 38-840 comprised within the arrangement 800 in the base station 28 are to be regarded as separate logical entities but not with necessity separate physical entities. To mention just one example, the receiver 805 and the sender 820 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the base station 28 and the user equipment 30 may comprise both traffic and control signals e.g. paging signals/messages for incoming calls, which may be used to establish and maintain a voice call communication with another party or to transmit and/or receive data, such as SMS, e-mail or MMS messages, with any remote user equipment.

The present mechanism for assisting a user equipment 30 in sending scheduling requests SR may be implemented through one or more processors 840 in the base station arrangement 800 depicted in FIG. 8, together with computer program code for performing the method steps 701-703 of the present solution. The program code mentioned above may also be provided as a computer program product, for instance in the form of a data carrier carrying computer program code for performing the present solution when being loaded into the base station 28. One such carrier may be in the form of a memory stick. It is however feasible with other data carriers. The computer program code may furthermore be provided as program code on a server and downloaded to the base station 28 remotely.

When using the formulation "comprise" or "comprising" it is to be interpreted as non-limiting, i.e. meaning "consist at least of". The present invention is not limited to the above described preferred embodiments. Various alternatives, modifications and equivalents may be used. Therefore, the above embodiments are not to be taken as limiting the scope of the present invention, which is defined by the appending claims.

The invention claimed is:

1. A method in a base station for assisting transmission of scheduling requests to the base station, the base station being adapted to serve a user equipment that is configured to transmit scheduling requests to the base station only at certain predetermined scheduling request opportunities, the method comprising:
   determining a factor k to be transmitted to the user equipment enabling the user equipment to calculate a scheduling request prohibiting timer length;
   transmitting the determined factor k to the user equipment;
   scheduling the user equipment when a scheduling request is received, on a Physical Uplink Control CHannel (PUCCH) resource, from the user equipment; and
   receiving no further scheduling requests from the user equipment until a period of time equal to the scheduling request prohibiting timer length expires;
   wherein:
   the scheduling request comprises a first scheduling request; and
   scheduling the user equipment comprises receiving the first scheduling request from the user equipment and scheduling the user equipment in response to the first scheduling request, and
   wherein receiving no further scheduling requests from the user equipment until a period of time equal to the scheduling request prohibiting timer length expires comprises receiving no further scheduling requests from the user equipment until a period of time equal to a time between two scheduling request opportunities multiplied by the determined factor k expires.

2. The method of claim 1, wherein receiving no further scheduling requests from the user equipment until a period of time equal to the scheduling request prohibiting timer length expires comprises receiving no further scheduling requests from the user equipment until a period of time equal to a time between two scheduling request opportunities multiplied by a sum of the determined factor k and a random variable l expires.

3. The method of claim 1, wherein transmitting the determined factor k to the user equipment comprises transmitting the determined factor k from the base station to the user equipment via Radio Resource Control (RRC) signalling.

4. The method of claim 1, wherein scheduling the user equipment comprises transmitting a scheduling grant allocating resources for uplink transmission to the user equipment.

5. The method of claim 4, further comprising, after transmitting the scheduling grant to the user equipment, receiving data from the user equipment on the allocated resources.

6. A base station apparatus for assisting a user equipment in transmitting scheduling requests, the user equipment being configured to transmit scheduling requests to only at certain predetermined scheduling request opportunities, the base station apparatus comprising:
   a determination unit configured to determine a factor k to be transmitted to the user equipment, thereby enabling the user equipment to calculate a scheduling request prohibiting timer length;
   a transmitter configured to transmit the determined factor k to the user equipment;
   a scheduler configured to schedule the user equipment when a scheduling request is received, on a Physical Uplink Control CHannel (PUCCH) resource, from the user equipment; and
   the base station apparatus is configured to receive no further scheduling requests from the user equipment until a period of time equal to the scheduling request prohibiting timer length expires;

wherein:
the scheduling request comprises a first scheduling request; and
the scheduler is configure to schedule the user equipment by receiving the first scheduling request from the user equipment and scheduling the user equipment in response to the first scheduling request, and
wherein the scheduling request prohibiting timer length is equal to a time between two scheduling request opportunities multiplied by the determined factor k.

7. The base station apparatus of claim 6, wherein the scheduling request prohibiting timer length is equal to a time between two scheduling request opportunities multiplied by a sum of the determined factor k and a random variable l.

8. The base station apparatus of claim 6, wherein the transmitter is configured to transmit the determined factor k to the user equipment by transmitting the determined factor k from the base station to the user equipment via Radio Resource Control (RRC) signalling.

9. The base station apparatus of claim 6, wherein the scheduler is configured to schedule the user equipment by transmitting a scheduling grant allocating resources for uplink transmission to the user equipment.

10. The base station apparatus of claim 9, further comprising a receiver configured to receive data from the user equipment on the allocated resources.

* * * * *

UNITED STATES PATENT AND TRADEMARK OFFICE
CERTIFICATE OF CORRECTION

PATENT NO. : 9,173,203 B2
APPLICATION NO. : 14/033939
DATED : October 27, 2015
INVENTOR(S) : Susitaival et al.

It is certified that error appears in the above-identified patent and that said Letters Patent is hereby corrected as shown below:

On the Title Page, in Item (57), under "ABSTRACT", in Column 2, Lines 13-14, delete "Also,................described." and insert the same at Line 12, after "running.", as a continuation paragraph.

On Page 2, in Item (56), under "OTHER PUBLICATIONS", in Column 2, Line 2, delete "Univeral" and insert -- Universal --, therefor.

Specification

In Column 1, Line 8, delete "2011," and insert -- 2011, now Pat. No. 8,543,125, --, therefor.

In Column 10, Lines 19-20, delete "network 100." and insert -- system 100. --, therefor.

In Column 13, Line 29, delete "sender 820" and insert -- transmitter 820 --, therefor.

Claims

In Column 15, Line 11, in Claim 7, delete "6 ," and insert -- 6, --, therefor.

Signed and Sealed this
Sixteenth Day of August, 2016

Michelle K. Lee
*Director of the United States Patent and Trademark Office*